Nov. 21, 1933.  E. T. BURTON  1,936,153
ELECTRIC WAVE TRANSMISSION SYSTEM
Filed May 26, 1928  2 Sheets-Sheet 1
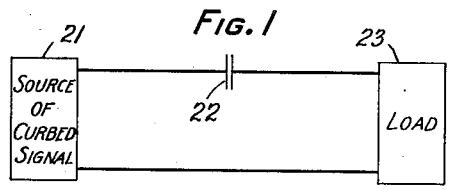
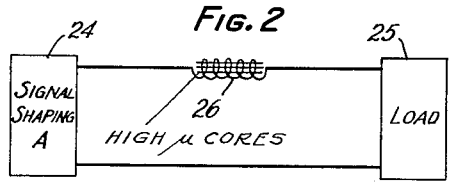
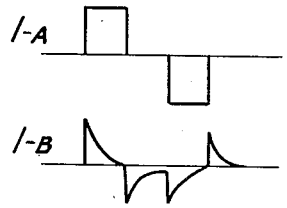
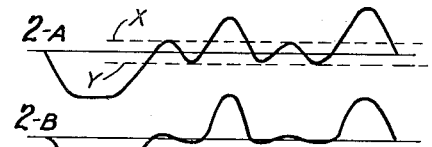
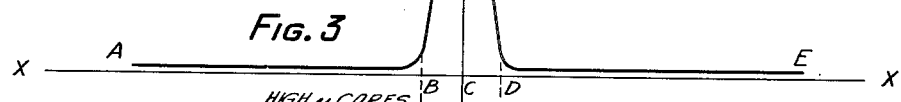
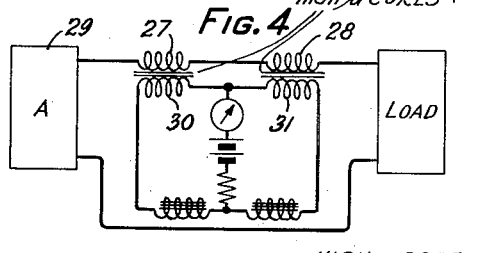
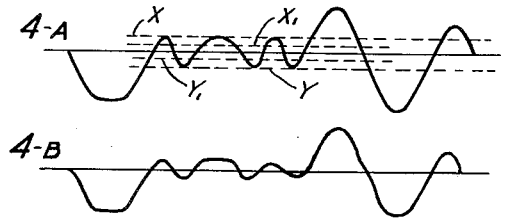
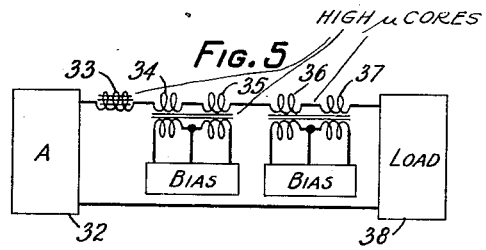
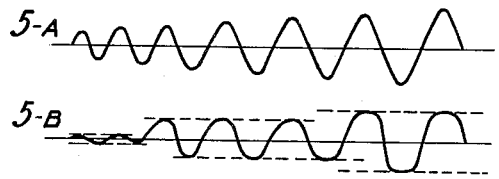
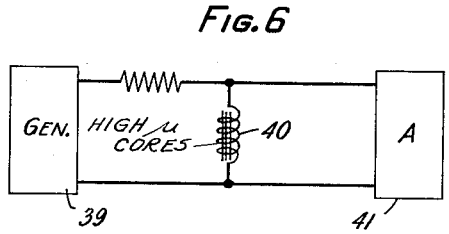
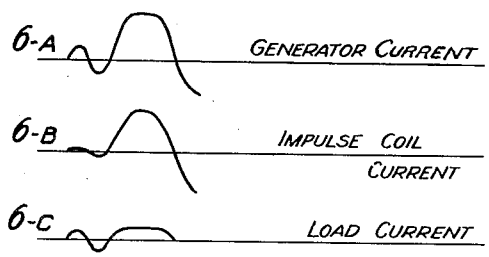
INVENTOR
EVERETT T. BURTON
BY J. W. Schmied
ATTORNEY Nov. 21, 1933.   E. T. BURTON   1,936,153
ELECTRIC WAVE TRANSMISSION SYSTEM
Filed May 26, 1928   2 Sheets-Sheet 2
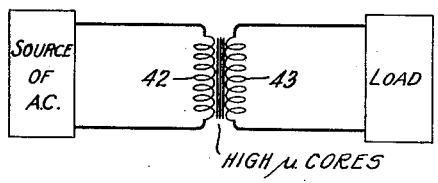
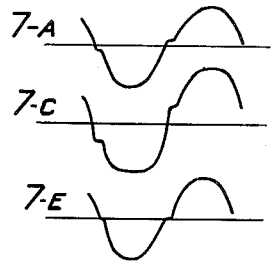
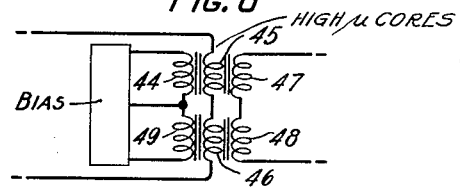
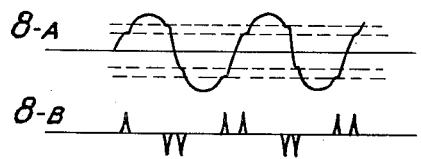
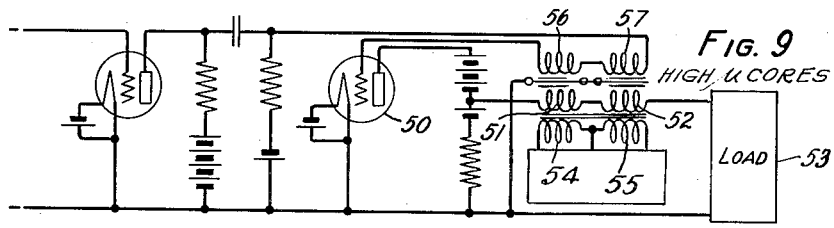
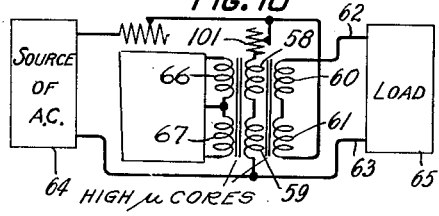
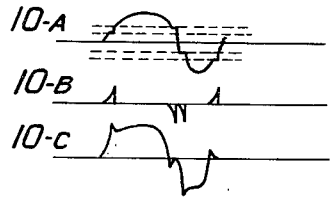
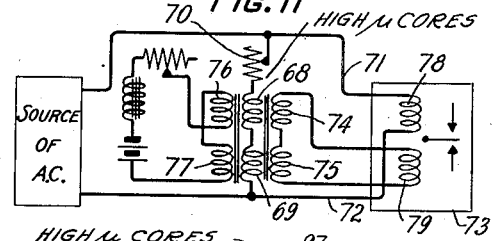
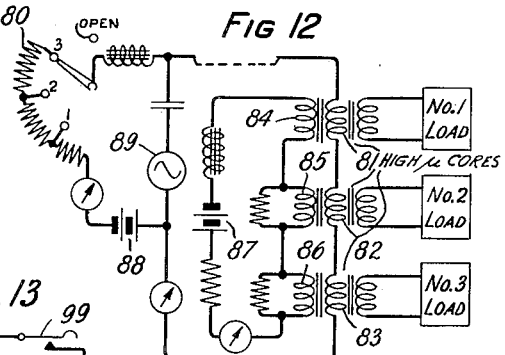
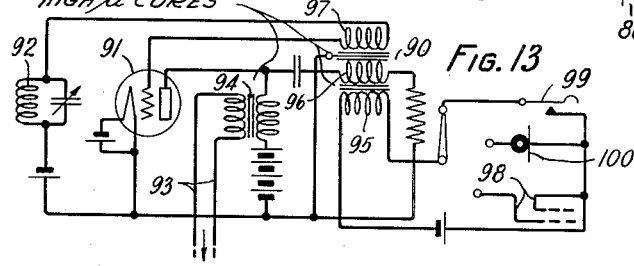
INVENTOR
EVERETT T. BURTON
BY
J. W. Schmied
ATTORNEY Patented Nov. 21, 1933

1,936,153

UNITED STATES PATENT OFFICE 1,936,153

ELECTRIC WAVE TRANSMISSION SYSTEM

Everett T. Burton, East Orange, N. J., assignor to Bell Telephone Laboratories, Incorporated, New York, N. Y., a corporation of New York Application May 26, 1928. Serial No. 280,700

14 Claims. (Cl. 178—63)

This invention relates to wave shaping by means of inductance coils and may be practiced most effectively by such coils comprising core material of high permeability.

An object of this invention is to pre-shape signals in a signaling system, adapted for high speed transmission, by means of inductance coils.

Another object is to reduce the cost of apparatus required for transmitting, repeating and shaping signal impulses.

The features of the invention are of general application for converting the wave form of or selectively discriminating between current impulses of wave forms commonly employed in telegraphic, picture transmission, television or similar systems.

Heretofore several types of devices have been employed for pre-shaping signals, the most generally used types being sending networks, electromagnetic relays and vacuum tube amplifiers. Sending networks, particularly those employed in high speed transmission, comprise various arrangements of capacity-resistance networks which do not readily permit a wide latitude of adjustments of the electrical characteristics of the transmission circuits. Electromagnetic relays have been commonly used for producing square-topped waves such as are used in telegraphy while vacuum tube amplifiers have been preferred for reproducing, in the proper proportions, waves of varied intensity. Electromagnetic relays, however, have moving mechanical parts with mass and therefore mechanical inertia. They likewise have electrical contacts which must close with a certain amount of pressure and must not chatter if good reproduction is to be realized. Furthermore, they require inductive windings in which time is required to build up an electric current. Because of the electrical and mechanical inertia of the input windings and moving parts respectively, and because of the contact resistance, electromagnetic relays are not entirely satisfactory at high signaling speeds or frequencies. Vacuum tube amplifiers, on the other hand, are capable of operation at extremely high frequencies since they have no appreciable electrical or mechanical inertia at frequencies used in impulse telegraphy and they have no movable contacts. They have an output voltage which is not always a linear function of their input voltage and are responsive to slight voltages emanating from extraneous sources which may be superposed on the input voltages, thereby causing a distortion in the outgoing signals.

According to the present invention shaping of signal waves for various purposes is accomplished by inductance coils. In particular, and, by the way of example, in a high speed signaling system, waves may be pre-shaped in a simple, efficient and economical manner by employing high permeability inductance coils whereof a greatly overloaded magnetic circuit is utilized for changing a signal wave of somewhat slowly varying intensities to a wave of sharp, discrete impulses such as is desirable for transmission over a transmission line or submarine cable of great overall attenuation.

Some characteristic features of this invention are: Suppressing current waves of low amplitudes and high frequencies; shifting the range of suppressed current waves and frequencies by superposing a biasing current on the magnetic circuit, and breaking up a gradually varying voltage of alternating current envelope into ranges of definite amplitudes; producing short, sharp impulses in a secondary circuit of a transformer when the primary current reaches such value as to overload the magnetic circuit or to restore it to normal condition; arbitrarily determining the range of positive and the range of negative values at which the current in the primary windings of a pair of transformers, serially connected, become effective to produce short, sharp impulses in the secondary windings whereby the voltages in the vicinity of zero and maximum current values are ineffective and the intermediate voltages are effective to produce the impulses, double impulses being produced every time the direction of the primary current is reversed; impressing such short, sharp or other secondary impulses on the grid circuit of a vacuum tube amplifier for regenerative shaping; repeating a current wave of comparatively slowly varying intensities as a substantially square-topped wave; and selectively operating remotely controlled circuits.

This invention will be better understood by reference to the following detailed description taken in connection with the accompanying drawings in which:

Fig. 1 shows diagrammatically a simple type of preshaping network by which curbed, square-topped signals are passed through a condenser;

Fig. 2 shows a single high permeability inductance coil in series with a signaling circuit arranged to suppress the low voltages and high frequencies of the signaling current;

Fig. 3 represents the current-inductance characteristic of a high permeability inductance coil of negligible hysteresis.

Fig. 4 shows a modification of Fig. 2 in which a pair of coils are employed, each of which is equipped with a biasing winding, for suppressing the band of higher voltages;

Fig. 5 illustrates an arrangement in which a plurality of coils are connected in series with a signaling circuit and are effective to separate a gradually varying alternating current envelope into separate ranges of definite amplitudes by the utilization of the suppressing effect;

Fig. 6 shows a modification of Fig. 2 wherein the coil is connected in shunt to some portion of the circuit wherein the suppressed voltages and frequencies may be utilized;

Fig. 7 shows a high permeability transformer whereby a signaling wave of slowly varying intensity is changed to a wave of short, sharp, discrete impulses;

Fig. 8 shows a modification of Fig. 7 wherein two transformers are connected in series and a pair of windings added to bias the magnetic circuit in opposite directions;

Fig. 9 shows the transformers associated with a circuit connected to a vacuum tube amplifier wherein regenerative shaping of signals is effected;

Fig. 10 illustrates the transformers with their primary windings connected in shunt to and their secondary windings connected in series with a voltage output circuit;

Fig. 11 shows a modification of Fig. 9 wherein the two primary windings are connected in a high impedance path in shunt to a current output circuit which includes the winding of a relay, and the secondary windings are connected in series with a separate winding of the relay; and Fig. 12 shows the transformers used in connection with a plurality of circuits arranged for selective operation.

Fig. 13 shows a thermionic oscillator circuit controlled by a biased impulse coil transformer.

Referring to the drawings Fig. 1 shows a portion of the circuit known as the sending network heretofore used for shaping signals and forms no part of the present invention. It is shown merely to point out the similarity in the effect produced by some of the arrangements disclosed in this application. In Fig. 1 the curbing device which may be a rotary distributor, is represented diagrammatically by block 21, and is arranged in repeating a square-topped signal wave to suppress a portion of each signal. The suppressed signals represented by curve 1—A, are shown as having the latter portion of each impulse reduced to zero value whereby the signals are separated into square-topped impulses of half-unit length and are in this form impressed on condenser 22. The sharp rise and fall of the suppressed impulses causes the condenser to charge rapidly first in one direction and then in the other thereby producing in the output a voltage wave desirable for transmission over a long transmission line. When the voltage is applied the current rises at once to a maximum value and then falls away, rapidly at first and then gradually, to zero value. This operation is shown in curve 1—B which is representative of the wave form which is transmitted to a transmission line diagrammatically shown as block 23. It will be noted in the latter curve that an impulse is produced in the output circuit every time the condenser charges and discharges. The condenser method of shaping signals when used with signals appearing in the form of a sine wave or rounded wave of alternating current does not give the desired rise and fall to the output signal wave as shown in curve 1—B, but by employing inductance coils having core material of high permeability at low magnetizing forces this effect is obtained in a rounded wave of alternating current as is hereinafter described. These inductance coils are referred to herein as impulse coils and may have numerous uses a few of which will now be described.

Fig. 2 shows an impulse coil used to suppress the low voltages and high frequencies of a signal current. This arrangement may be adaptable to telegraph receiving systems designed to effectively receive signal impulses of only two or more units length and provided with a vibrating relay arrangement for replacing the impulses of unit length which are greatly attenuated during transmission. In a system of this character the signal impulses received from the line pass through an amplifier 24 where they are amplified so that ordinarily the impulses of two or more units length are just sufficiently amplified to operate a signal relay represented diagrammatically by block 25. Should any of the received signal impulses of unit length have superposed thereon the electrical disturbance emanating from some extraneous source, the sum of the disturbance voltage and the signal voltage may be sufficient to cause false operation of the signal relay. Therefore, in order to avoid this condition an impulse coil 26 is connected in series with the output circuit of the amplifier. The impulse coil has core material of high permeability at low magnetizing forces and upon receiving the varying voltages the core material becomes saturated when the current rises in voltage slightly above zero value. Consequently when the current is in the neighborhood of zero value, the inductance of the circuit is caused to rise for an instant to a high value which causes the coil to act as a high impedance to a current rising through values between zero and the point of saturation. Since the effective value of the coil impedance is equal to 2—fL, in which f is the frequency of the current and L the inductance of the coil, the suppressing effect is greatest for low voltages and high frequencies. In this manner only those currents having amplitudes above that at which saturation of the coil occurs flow through the signal relay in appreciable amounts and it may readily be arranged by proper choice of coil constants that these amplitudes are attained by only those signals composed of impulses of two or more units length, the signals of high frequency and low amplitudes composed of single impulses being almost entirely suppressed. Curve 2—A represents the output current of amplifier 24 which corresponds to the received signal wave which in turn corresponds to the transmitted signal wave composed of impulses of various lengths. Broken lines x and y on curve 2—A represent the positive and the negative values respectively at which the core becomes saturated. Curve 2—B represents current received in the signal relay wherein the signal impulses of unit length, being of low amplitude and high frequency, are substantially suppressed and the signal impulses of two or more units length saturate the core and are therefore effective to operate the relay.

Fig. 3 shows the current-inductance characteristic of an impulse coil having negligible hysteresis. Ordinarily the maximum amplitude of varying currents passed through an impulse coil is such that the effect of coil hysteresis is negligible. Therefore the curve of Fig. 3 is a fair representation of the inductance variation under ordinary operating conditions. As the current begins to rise as indicated at point A on axis $x$—$x$ the inductance represented by axis $y$—$y$ is of a low value and remains substantially constant until the current reaches a value at point B. After passing point B the inductance rises rapidly to a high value and as the current reaches the value indicated by point C the inductance decreases rapidly as shown until the current reaches the value at point D which represents the point of saturation at which the inductance again becomes negligible as indicated by the curve between D and E. During the interval BD whereby the inductance rises for an instant to a high value as indicated by the curve, the coil acts as a high impedance and thereby suppresses the current values between B and D.

Fig. 4 shows a modification of Fig. 2 wherein a pair of impulse coils 27 and 28 are connected in series in the output circuit of amplifier 29. In order to suppress higher amplitudes than those suppressed by the arrangement of Fig. 2, biasing windings 30 and 31 are inductively connected with coils 27 and 28 respectively, whereby the magnetic circuits of the latter coils are oppositely biased by a direct current as shown. This bias is provided to oppose the magnetic flux produced by the current in coils 27 and 28 until such current attains a value whereat the magneto-motive force produced thereby is equal and opposite to the magneto-motive force produced by the biasing current in either of the coils 30 or 31. In this way the ranges of high inductance of the two coils are shifted in opposite directions away from the point of zero signal current thereby causing the suppression of the signaling current to include higher amplitudes than those of the arrangement shown in Fig. 2. In curve 4—A is shown a rounded signal wave of alternating current, composed of signal impulses of various lengths, as it enters coil 27. Broken lines $x_1$ and $y_1$ represent the positive and the negative values respectively at which the sum of the magneto-motive force produced by the signaling current and that produced by the biasing current is equal to zero. These lines respectively mark the beginning of the higher ranges of high inductance which now extend to the new points of saturation indicated by broken lines $x$ and $y$. Curve 4—B shows the suppressed wave in which only the current of a value within the ranges of high inductance is suppressed, the current of amplitude outside such ranges being allowed to pass through the coils 27 and 28 with substantially no suppression.

The principle involved in Fig. 4 may be extended as shown in Fig. 5 whereby several pairs of biasing coils having progressively adjusted saturation values of current may be employed in the output circuit of amplifier 32 for suppressing different groups of voltages. The circuits of each pair of biasing coils represented diagrammatically by a block designated "Bias", may be the same as the biasing circuits shown in Fig. 4. The first impulse coil 33 has no bias and like the arrangement shown in Fig. 2 suppresses the amplified current within the range of voltages slightly above and slightly below the zero value. Impulse coils 34 and 35 are slightly biased in opposite directions to suppress higher ranges of voltages and impulse coils 36 and 37 are similarly biased to suppress still higher ranges of positive and negative voltages. With this arrangement a varying current is subjected in each half cycle to a high impedance during the different intervals of high inductance afforded by the respective impulse coils and the current of the values adjacent to zero, between the intervals of high inductance, and adjacent to the maximum value are allowed to flow to a load circuit such as a relay diagrammatically represented by block 38. In this way an envelope of a gradually varying alternating current for example as shown in curve 5—A may be separated into ranges of distinct amplitudes as shown in curve 5—B.

Fig. 6 illustrates how an impulse coil may be arranged in shunt to a portion of a circuit whereby the curents of low voltage and high frequencies, which are suppressed by the momentary high inductance of the coil, may be utilized in the shunted portion of the circuit. Assuming that an alternating current is flowing from a generating device represented diagrammatically by block 39, an impulse coil 40 connected in shunt as shown, presents a high impedance to the low voltage and high frequency components of the generated current and these components may be utilized in the shunted portion of the circuit for other purposes such as to operate some form of electrical device 41, for example, a relay, or a vacuum tube amplifier. Curve 6—A is a current wave caused by the voltage across the generator terminals, curve 6—B represents the current wave allowed to flow through coil 40 wherein the current components of low voltages and high frequencies are suppressed as shown in Fig. 2, and curve 6—C represents the current components of low voltage and high frequencies which are prevented from flowing through coil 40 but are permitted to energize a load circuit 41.

When an impulse coil is used in the form of a transformer as schematically shown in Fig. 7 the primary winding 42 has the same effect on the input current as the coil 26 in Fig. 2 whereby the magnetic circuit of the transformer becomes saturated at a low voltage and the inductance is consequently caused to momentarily rise to a high value as the varying primary current voltage rises from or passes through zero value. This sudden rise in inductance presents a high impedance to the input current as indicated in the curves 7—A, 7—C and 7—E. When the inductance of the primary winding rises to a high value there is produced in the secondary winding 43 a voltage impulse, the intensity and duration of which are regulated by the electrical constants of the transformer. These voltage impulses shown in curves 7—BB, 7—D and 7—F, are produced immediately before the magnetic circuit becomes saturated and are in the same direction as the input current which produces the high inductance. When the impulse coil is employed as a transformer the ratio of the peak amplitude of the secondary impulses to the width of their base is increased by increasing the number of turns in the primary winding, reducing the length of the transformer core, increasing the permeability of the core material, increasing the primary current and increasing the primary current steepness over the region of high coil impedance. These functions all tend to reduce the interval, referred to herein as an active interval, in which the secondary impulses occur. If hysteresis is present in the transformer in an appreciable amount a lag of the active interval occurs as shown in curve 7—C, but this may be reduced by any of the above methods for reducing the active interval whereby the primary current and secondary voltage are affected as shown in curves 7—E and 7—F. Consequently, the wave shape of the produced impulse and the effect of the coil is to some extent dependent upon and a function of the hysteresis of the core material.

In Fig. 8, which is a modification of Fig. 7, two transformers comprising impulse coils, are shown connected in series. Coils 45 and 46 represent the primary windings and coils 47 and 48 are the secondary windings. The transformers are biased by a direct current flowing in opposite directions through the coils 44 and 49 which represent the biasing windings. The opposite biasing currents prevent any alternating current flowing in the primary windings from producing an effective inductance until the magneto-motive force of the primary current becomes equal and opposite to that of the current in either of the biasing windings. When these magneto-motive forces become equal the inductance rises to a high value almost instantaneously to produce a voltage impulse in one of the secondary windings. This voltage impulse is short and sharp because the magnetic circuit becomes quickly saturated or overloaded. Therefore the alternating current is effective to produce a voltage impulse in either of the secondary windings only in those intervals in which the current is passing through the narrow range of values effective to produce high inductance and which occur twice in each positive and each negative sweep of the current wave. In order to insure these voltage impulses being short and sharp a high impedance such as a choke coil, may be placed in series with each of the biasing windings. In curve 8—A an alternating current is shown subjected to a high impedance during the intervals of high inductance which occur twice during each positive and each negative sweep of the current wave as indicated by the indentations between the broken lines. Curve 8—B represents the voltage impulses occurring in the secondary windings during the active intervals, the impulses produced by the positive sweep occurring in one of the secondary windings and those produced by the negative sweep in the other. The voltage impulses shown in curve 8—B are similar to the current impulses shown in curve 1—B but are of shorter duration.

Fig. 9 shows the arrangement of Fig. 8 wherein the secondary circuit of two transformers connected in series is included in the grid circuit of a vacuum tube amplifier tube 50 whose plate circuit is connected to the input or primary circuit of the transformers. Vacuum tube amplifier 50 is connected to a relay or other receiving device designed to receive signals of alternating current through the primary windings 51 and 52. By use of the oppositely and equally biased windings 54 and 55 two voltage impulses are induced into the secondary windings 56 and 57 during each positive and each negative sweep of the alternating current wave. These impulses are fed back to the grid of the amplifier 50 to provide regenerative shaping of the signal wave flowing to the receiving device represented diagrammatically by block 53. The biasing circuits which respectively include the windings 54 and 55, are the same as those represented diagrammatically in Fig. 8 by the block designated "Bias". The curves representing the primary current, the secondary voltage impulses and the reshaped or regenerated current are substantially the same as those which will hereinafter be described in connection with Fig. 10.

Fig. 10 also shows the arrangement of Fig. 8 modified to show the primary windings 58 and 59 connected in shunt to and the secondary windings 60 and 61 in series with a voltage output circuit 62—63. The primary windings provide a path of low impedance for the alternating current so that in the output circuit of a source of varying currents 64 only a small portion of the full output voltage is impressed on the receiving device represented diagrammatically by block 65. Windings 66 and 67 are equally and oppositely biased so that there are in each positive and each negative sweep of the alternating current wave two intervals during which voltage impulses occur in either of the secondary windings. These impulses are superposed on and in phase with the carrying voltages applied to the block 65 and supplied by direct connection from the source of current 64. The result is to give to the voltage wave rising or falling portions which are steeper than those of the applied voltage by virtue of the addition of the impulse voltages. The biasing circuits used in this figure are substantially the same as those used in Figs. 8 and 9. Curve 10—A represents the current which flows through the primary windings of the coils and through the series resistance 101. Curve 10—B represents the voltage impulses which occur in the secondary windings during the intervals in which the coils rise to high inductance. The curve 10—C represents the output voltage wave of the transformer in which the voltage impulses are superposed on the voltage supplied directly from the source of currents 64 to the block 65 to produce a voltage wave form similar to that shown in Fig. 10—A except that the rising and falling part of the voltage curve has been made much sharper.

In Fig. 11 is shown a modification of Fig. 10 wherein the respective primary windings 68 and 69 of two transformers are connected in series with a resistance 70 of high value to form a circuit in shunt to the output circuit 71—72. A large portion of the current therefore flows in the output circuit in which is connected a winding 78 of a relay for example represented diagrammatically by block 73. The secondary windings 74 and 75 are connected to a second winding 79 of the relay. The biasing effects produced by the oppositely biased windings 76 and 77 cause voltage impulses to be produced in the secondary windings during the intervals of high inductance as hereinbefore described. These impulses are impressed on the winding 79 of the relay simultaneously with the flow of current through winding 78. By virtue of the addition of the fluxes produced by the currents in the two windings 78 and 79, the rise and fall of flux in the block 73 is increased and consequently the speed of operation of the relay is increased and the duration of the intervals during which the armature of the relay is in motion, is decreased. The biasing effects are identical with those produced by the biasing circuits shown in Figs. 8, 9 and 10, although the respective biasing windings 76 and 77 of the two transformers are included in a single circuit.

Fig. 12 shows a plurality of impulse coils arranged to operate successively or selectively a series of remotely controlled circuits. Assuming that the equipment at the left and the right-hand sides, respectively, of the "dash-line" conductors are the controlling and the controlled ends of a system, a rheostat 80 at the left-hand side is provided for producing changes in current values for selectively operating the circuits Nos. 1, 2 and 3 at the right-hand side. The circuits Nos. 1, 2 and 3 are inductively coupled to the impulse coils 81, 82 and 83 each of which is provided with a distinctive value of biasing flux by the coils 84, 85 and 86 respectively and battery supply 87. Through the main winding of each coil is passed from a source 88 a current which is controlled by rheostat 80 and for each of the series of current values furnished from such source the biasing flux of one of the coils 81, 82 or 83 is neutralized. The particular coil which becomes active by neutralization of the bias flux provides effective coupling between its associated circuit Nos. 1, 2, or 3 and an oscillator 89 thereby causing the particular circuit to respond to the oscillator current for operation of a signal or other device.

In Fig. 13 is represented the circuit diagram of a thermionic oscillator circuit controlled by an impulse coil 90. The oscillator tube 91 has connected to it a tuned circuit 92 and an output or load circuit 93 coupled by a transformer 94. Coil 90 has windings 95, 96, and 97. Windings 96 and 97 are shielded from each other electrostatically. When a small current is flowing in the windings the coil 90 provides enough feed back so that the tube circuit oscillates. The current in the winding 95 may be made to control the tube by so nearly saturating the coil core that there is not sufficient coupling to permit oscillation to occur. Winding 95 may be controlled by any device such as a key 99, microphone 100, or incoming line 98. These devices may serve to vary the current flowing in winding 95 and thus control the oscillations.

The oscillator may be tuned to generate oscillations of any desired frequency as for example a carrier wave which will be modulated.

It may also be adjusted so that the current flowing in winding 95 renders it non-oscillatory but if an incoming impulse causes the coil to pass through an active region the coil 90 will supply a feed back voltage to the grid of tube 91 and an oscillation will begin. This may be at any desired frequency as determined by tuned circuit 92. If the incoming impulse passes quickly causing coil 90 to pass through the active zone only a short sharp impulse will be supplied to the load circuit 93.

What is claimed is:

1. In a transmission system comprising a circuit, an inductance coil and a receiving device connected in series in said circuit, means for transmitting through said circuit to said receiving device a current of varying intensity, and a core for said coil designed to become magnetically overloaded or saturated at extremely low magnetizing forces, a method of suppressing low voltages and high frequencies of the current wave from said transmitting means which consists in impressing the transmitted current wave on said coil wherein the extremely low voltages and high frequencies of the waves are suppressed and impressing the output of said coil on said receiving device whereby the receiving device is responsive to the higher voltages and lower frequencies only of the current wave transmitted by said transmitting means.

2. In operating a transmission system comprising a circuit and an inductance coil connected in series therewith and having core material of high permeability at low magnetizing forces, and means for transmitting over said circuit a current wave composed of impulses of varying intensity, the method of suppressing the impulses of certain voltages which consists in overloading in response to the transmitted current wave, the magnetic circuit of the coil at the extremely low voltages of said transmitted wave and applying a biasing current to the inductance coil to shift the range of voltages at which said coil constitutes an effective inductance to a range of higher voltages whereby the voltages within the shifted range are suppressed.

3. In a transmission system comprising a circuit, means for transmitting over said circuit a current wave of varying intensity, means for dividing said wave into separate ranges of definite voltages which comprises lumped impedances connected to said circuit, and means for applying to each of certain pairs of lumped impedances opposing biasing currents of a distinct value, the biasing current applied to one impedance of each of certain pairs being of one polarity and the biasing current applied to the other of said certain pairs being of the other polarity, whereby different ranges of voltages of the current wave are successively suppressed.

4. In a transmission system comprising a circuit and a transformer connected in series therewith, and means for transmitting over said circuit a current wave of slowly varying intensity, the method of producing electrical impulses of high voltage but of short duration as compared to the intervening intervals of zero voltage in the produced voltage wave, which consists in overloading the magnetic circuit of the transformer at an extremely low voltage, and impressing said current wave on said magnetic circuit whereby the range of current in said wave at which the transformer is effective as an inductance is reduced to such limits that the inductance is caused to rise to a high value momentarily as the current wave rises through the voltages in this range.

5. In a transmission system comprising a circuit and a transformer connected in series therewith, and means for transmitting over said circuit a current wave of varying intensity, the method of reproducing the transmitted current wave as a wave of sharp impulses of short duration as compared with the intervening comparatively long impulses of zero voltage, and of regulating the duration of the impulses at intervening intervals of zero voltage, which consists in overloading the magnetic circuit of the transformer at an extremely low voltage, impressing said current wave on said magnetic circuit whereby the range of current in said wave at which the primary winding is effective to induce a voltage in the secondary winding, is reduced to within such limits that the rate of change of flux is caused to rise from zero to a comparatively very high value and back to zero instantaneously, and in applying a biasing current to the transformer to shift the said range to include any desired group of current intensities within the transmitted current wave.

6. In operating a transmission system comprising a circuit, means for transmitting currents of varying positive and negative voltages, transformers comprising primary windings connected to said means, secondary windings connected to an output circuit, and biasing windings connected to a source of current, the method of producing two short sharp impulses of opposite polarities for each positive and each negative sweep of the said transmitted current wave, which consists in utilizing a biasing current to saturate the transformers at the low voltages of the primary current, and utilizing the primary current itself to saturate the transformers at its high voltages, the intermediate range of voltages being effective to cause the inductance of either of the transformers, depending on the polarity of the primary current, to rise to a high value to thereby produce a sharp impulse followed by a relatively long interval of zero voltage each time the primary current rises through a predetermined voltage in varying either up or down between maximum and zero values.

7. In operating a transmission system, a circuit comprising a source of alternating current, a pair of transformers having primary windings connected in the output circuit of said source, biasing windings respectively associated with the primary windings and biased in opposite directions, and secondary windings respectively associated with said primary windings, the method of generating impulses to amplify portions of said alternating current only at certain selected ranges of current voltages which consists in utilizing a biasing current to saturate the transformers at the low voltages of the primary current, and utilizing the primary current itself to saturate the transformers at its high voltages, certain ranges of intermediate voltages being effective to cause the inductance of the primary windings to rise to a high value to thereby produce two sharp impulses of opposite polarities each time the primary current passes from zero to maximum value and back to zero, and in impressing the sharp impulses on the alternating current to increase the amplification of certain portions of the alternating current wave.

8. In operating a transmission system comprising a circuit, means for transmitting over said circuit a current wave of positive and negative polarities, transformers comprising primary windings connected in said circuit, secondary windings connected in series with said circuit, and biasing windings connected to a source of current, the method of reproducing a current wave of varying amplitudes as a substantially square-topped wave which consists in utilizing a biasing current to saturate the transformers at the low voltages of the primary current, utilizing the primary current to saturate the transformers at the high voltages, and utilizing the intermediate range of voltages to cause a sudden momentary rise in the inductance of either transformer, depending on the polarity of the primary current wave, to thereby produce two sharp voltage impulses in the secondary windings every time the primary current goes from zero to maximum value and back to zero, which impulses are superposed on the voltages received directly from said transmitting means to effect a sudden rise or fall to the voltages received directly from the transmitting means.

9. In operating a transmission system comprising a circuit, means for transmitting over said circuit a current wave of positive and negative polarities, a relay comprising a plurality of windings, transformers comprising primary windings connected in a high resistance path in said circuit, secondary windings connected in series with one of said relay windings, and biasing windings biased in opposite directions, the method of increasing the speed of operating the relay and reducing the duration of the interval in which the relay is operated, which consists in producing in one of said relay windings a voltage impulse at each rise and fall of a varying current flowing simultaneously through the other of said relay windings, the direction of the magnetomotive force of the impulses corresponding to the direction of that of the current.

10. In a transmission system, a circuit comprising a source of alternating current, a plurality of inductance coils having magnetic circuits designed to become saturated at an extremely low voltage of alternating current, a plurality of other coils for biasing said magnetic circuits in opposite directions respectively coupled to said plurality of inductance coils and designed to shift the saturation effect of said inductance coils to a higher voltage whereby variations of the current within the range of any group of voltages in the alternating current wave may be suppressed.

11. In a transmission system, means for producing two voltage impulses of opposite polarities interspersed with a comparatively long interval of zero voltage for each half cycle of a varying or alternating current comprising a source of varying current, an output circuit, a source of direct current, and a plurality of transformers having core material of high permeability at extremely low magnetizing forces, said transformers having primary windings connected in series with said varying current source, secondary windings connected in series with said output circuit, and biasing windings connected in opposite sense to said source of direct current.

12. In a transmission system, means for converting a gradually varying alternating current into a substantially square-topped wave comprising a source of alternating current, an output voltage circuit, a source of direct current and a pair of high permeability transformers having primary windings connected to said alternating current source and in shunt to said output circuit, secondary windings conductively connected in series with said alternating current source and said output circuit, and biasing windings connected in opposite sense to said source of direct current.

13. In a transmission system, means for increasing the speed of operating an impulse device and prolonging the operated condition of said device, said means comprising a varying current source, a source of direct current, an output current circuit, an impulse device having a plurality of windings one of which is connected in said output circuit, a resistance connected in series with said output circuit, and a pair of high permeability transformers having primary windings connected in series with said source of alternating current and said resistance, secondary windings connected in series with one of the windings on said impulse device, and biasing windings connected in opposite sense to said source of direct current, whereby the impulse device is operated and released, by voltage impulses in one winding thereof and maintained operated in the interval between such impulses by the current in the other winding.

14. Means for converting the wave form of telegraphic impulses which comprises an inductance coil so designed and means for so biasing the coil that when the telegraphic impulses are impressed thereupon the coil is effective as an impedance for current values of a range extremely small as compared to the entire range of current values of the impulses, said range lying anywhere between but not including the zero and maximum values of said impulses and means for impressing the impulses upon the coil.

EVERETT T. BURTON.